United States Patent [19]

Sogah

[11] Patent Number: 4,906,713

[45] Date of Patent: Mar. 6, 1990

[54] "ACRYLIC" LADDER POLYMERS

[75] Inventor: Dotsevi Y. Sogah, Wilmington, Del.

[73] Assignee: E. I. Du Pont de Nemours and Company, Wilmington, Del.

[21] Appl. No.: 304,681

[22] Filed: Jan. 31, 1969

[51] Int. Cl.$^4$ .................................. C08F 4/72
[52] U.S. Cl. ................... 526/170; 526/194; 526/286; 526/312; 526/321
[58] Field of Search ............... 526/194, 321, 170, 286, 526/312

[56] References Cited

U.S. PATENT DOCUMENTS

| | | | |
|---|---|---|---|
| 4,284,732 | 8/1981 | Petersen et al. | 252/609 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,681,918 | 7/1987 | Webster | 525/282 |
| 4,695,607 | 9/1987 | Spinelli | 525/272 |
| 4,711,942 | 12/1987 | Webster | 526/185 |
| 4,794,144 | 12/1988 | Spinelli | 525/293 |
| 4,810,756 | 3/1989 | Spinelli | 525/293 |

OTHER PUBLICATIONS

Billmeyer, Jr. F., "Textbook of Polymer Science", 1984, p. 427.
Webster et al., J. Amer. Soc., vol. 105, 1983, pp. 5706–5708.
Overberger et al., Adv. Polymer Sci., vol. 7, pp. 113–150 (1970).
Ogata et al., J. Polymer Sci., Part A–1, vol. 9 (1971), pp. 1759–1763.
Azuma et al., Polymer J., vol. 4, No. 6 (1973), pp. 628–636.

*Primary Examiner*—Joseph L. Schofer
*Assistant Examiner*—R. Delmendo

[57] ABSTRACT

Acrylic "Ladder" polymers and their preparation from difunctional monomers and difunctional initiators.

67 Claims, No Drawings

"ACRYLIC" LADDER POLYMERS

FIELD OF THE INVENTION

This invention relates to a process for the "living" group transfer polymerization of difunctional monomers to form a ladder polymer and to the polymers produced by such process. Such polymers are especially useful as coatings and finishes and may be useful in high temperature plastics or as liquid membranes.

For the purpose of this invention, a "ladder polymer" is schematically defined as a polymer of the following form,

which is constructed of a series of rungs held together by an aliphatic polymeric backbone (preferably of an acrylic type) via an ester or amide linkage.

BACKGROUND OF THE INVENTION

A current trend in polymer chemistry is to control the architecture of polymers produced from a variety of monomers. Group-transfer polymerization (GTP) is a new method of polymer formation that involves the repeated addition of monomer to an initiator to form a polymer with an active terminal group that is capable of polymerizing further in the presence of monomer and catalyst (Webster et al., J. Amer. Soc., Vol. 105, 1983, pp 5706–5708). Use of group transfer polymerization has resulted in processes for producing some unique comb, star and block copolymers. U.S. Pat. Nos. 4,414,372, 4,417,034, 4,508,880, 4,524,196, 4,581,428, 4,588,795, 4,656,233, 4,659,782, 4,659,783, 4,681,918, 4,695,607, 4,711,942 and commonly assigned serial numbers 627,919 filed July 5, 1984, and 771,685 and 771,686 filed Sept. 3, 1085, disclose processes for the "living" polymerization of an acrylic or maleimide monomer in the presence of an initiator. These patents and applications, while they separately mention the possibility of using initiators with more than one initiating site and of monomers with more than one active site, do not teach a GTP-process for producing a ladder polymer using a multifunctional initiator and a multifunctional monomer. In fact, 5,659,783 discloses that mixtures of monofunctional and difunctional monomers under GTP-polymerizing conditions produce gels, indicative of significant cross-linking during polymerization. It is thus surprising and unexpected that difunctional monomers can be used in the process of this invention to produce soluble ladder polymers.

Further, the prior art discloses no processes for preparing ladder polymers from acrylic or maleimide monomers using non-GTP processes.

Overberger et al., Adv. Polymer Sci., Vol. 7, pp 113–150 (1970), review general processes for the formation of several types of ladder polymers and discuss specific examples of each process. However, no example of a "classical ladder polymer" consistent with the definition of ladder polymers of this invention with ester- or amide-containing rungs is disclosed.

Ogata et al., J. Polymer Sci., Part A-1, Vol. 9 (1970), pp 1759–1763, disclose the photopolymerization of hydroquinone diacrylate in solution to give a highly swollen polymeric solid. The polymer is also swelled in dimethylformamide or dimethylacetamide, but is not truly soluble in any solvent. The polymer is degraded by sulfuric acid to hydroquinone and poly(acrylic acid).

Azuma et al., Polymer J., Vol. 4, No. 6 (1973), pp 628–636, disclose the photopolymerization of ortho-, meta-, and para-phenylene diacrylates (PDA). Intermolecular polymerization is favored for meta-, and para-PDA, leading to insoluble, cross-linked polymers. The so-called "ladder-type" polymer produced from ortho-PDA is more accurately described as a linear polymer with pendant macrocycles.

Peterson et al., U.S. 4,284,732, discloses polymers and copolymers based on the unsaturated bisesters of the formula

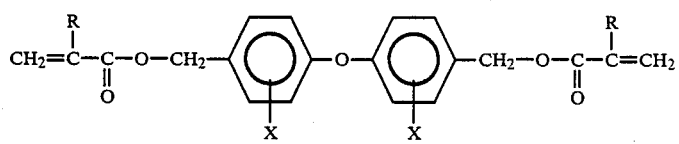

in which R represent hydrogen or a methyl group and X represents chlorine and/or bromine. However, the polymers obtained from these bis-esters by either radical or anionic polymerization are crosslinked insoluble homopolymers or copolymers, not ladder polymers.

SUMMARY OF THE INVENTION

The invention resides in a process for the preparation of ladder polymers by reacting, under group transfer polymerizing conditions, a difunctional initiator with a difunctional monomer in the presence of a catalyst to form a ladder polymer.

DETAILED DESCRIPTION OF THE INVENTION

The invention resides in the process comprising polymerizing a difunctional monomer of the form

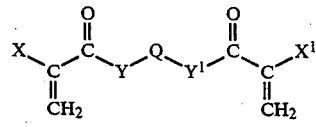

and mixtures thereof, wherein:

Q is $C_{3-15}$ alkylene or alkyl-substituted alkylene, $C_{4-12}$ cycloalkylene, $C_{6-14}$ arylene or alkyl-substituted arylene, $C_{7-30}$ alkarylene or aralkylene, where Q optionally contains silicon, tin or ether oxygen atom within alkylene segments;

X and $X^1$ are, independently, H, $CH_3$ or $CH_3CH_2$;

Y and $Y^1$ are, independently, O, S, NH or NR;

R is a hydrocarbyl or polymeric radical which is an aliphatic, alicyclic, aromatic or mixed aliphaticaromatic radical containing up to 20 carbon atoms, optionally containing up to 20 carbon atoms, optionally containing one or more silicon, tin or ether oxygen atoms within aliphatic segments thereof and optionally containing one or more functional substituents that are unreactive under polymerizing conditions; by contacting one or more monomers under polymerizing conditions at high dilution with:

(i) a difunctional initiator of the formula $$(R^1)(R^2)M(Z^1)(Z^2)$$

wherein:

$R^1$ and $R^2$, independently, are H or a hydrocarbyl radical which is an aliphatic, alicyclic, aromatic or mixed aliphatic-aromatic radical containing up to 20 carbon atoms, provided however that at least one of $R^1$ and $R^2$ is not H;

$Z^1$ and $Z^2$, independently, are activating substitutents selected from the group consisting of $-CN$, $-OP(NR'R'')_2$, $-OP(OR^1)_2$, $-OP[OSi(R^1)_3]_2$, $-SR^3$,

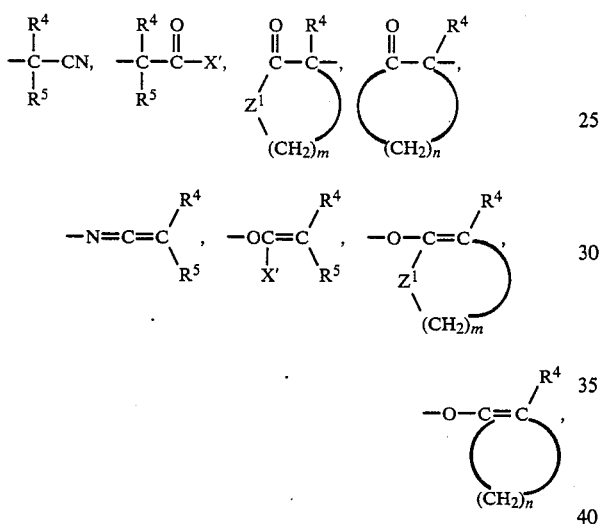

and mixtures thereof;

$X'$ is $-OSi(R^1)_3$, $-R^3$, $-OR^3$ or $NR'R''$;

each $R'$ and $R''$ is independently selected from $C_{1-4}$ alkyl; $R^3$ is a hydrocarbyl or polymeric radical which is an aliphatic, alicyclic, aromatic or mixed aliphatic-aromatic radical containing up to 20 carbon atoms optionally containing one or more silicon, tin or ether oxygen atoms within aliphatic segments thereof and optionally containing one or more functional substituents that are unreactive under polymerizing conditions; each $R^4$ and $R^5$ is independently selected from H and hydrocarbyl, defined as for $R^3$ above, and/or either $X'$ and $R^4$ or $X'$ and $R^5$ taken together are

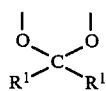

provided, however, $Z^1$ or $Z^2$ is

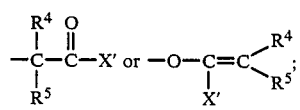

$Z'$ is 0 or $NR'$;

m is 2, 3 or 4;

n is 3, 4 or 5;

M is Si, Sn or Ge; and (ii) a co-catalyst which is a source of bifluoride ions, $HF_2^-$; or a source of fluoride, cyanide or azide ions; or a source of oxyanions, said oxyanions being capable of forming a conjugate acid having a pKa (DMSO) of about 5 to about 24, preferably 6 to 21, more preferably 8 to 18; or a suitable Lewis base, for example, a Lewis base of the formula selected from $(R^6)_3M'$ and

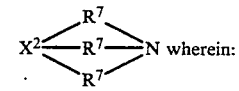 wherein:

$M'$ is P or As;

$X^2$ is $-N<$ or $-C(H)<$, provided, however when the monomer is a nitrile, $X^2$ is $-C(H)<$; each $R^6$, independently, is (a) a $C_{1-12}$ alkyl, $C_{4-12}$ cycloalkyl, $C_{6-12}$ aralkyl or di($C_{1-4}$ alkyl)amino group;

(b) a group of (a) wherein two or three of the alkyl, cycloalkyl and/or aralkyl groups are joined together by means of one or more carbon-carbon bonds;

(c) a group of (a) or (b) wherein the alkyl, cycloalkyl and/or aralkyl groups contain within aliphatic segments thereof one or more hetero atoms selected from O, N and S; or (d) a group of (a), (b) or (c) wherein the alkyl, cycloalkyl and/or aralkyl groups contain one or more substituents that are unreactive under polymerizing conditions; and each $R^7$ is $-CH_2CH_2-$ or $-CH_2CH_2-$ containing one or more alkyl or other substituents that are unreactive under polymerizing conditions to produce "living" ladder polymer having repeat units of the one or more monomers.

It will be understood by one skilled in the art that the last four members of the aforesaid group from which the activating substituents $Z^1$ and $Z^2$ are selected are the respective ketene imine or enol forms of the previous four members of the group. The mixtures of such members which are operable herein include, but are not limited to, the corresponding cyano-imime or keto-enol mixtures.

By "living" is meant a polymer of the invention which contains two or more active terminal groups and is capable of polymerizing further in the presence of monomer(s) and co-catalyst.

The polymers produced by the process of the invention are "living" polymers of the formula

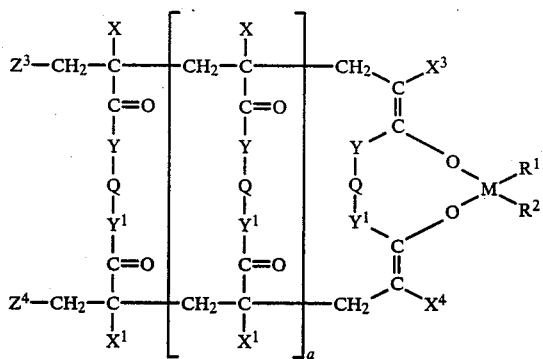

wherein $Z^3$ and $Z^4$ are independently selected from the group consisting of —CN, —OP(NR'R")$_2$, —OP(OR$^1$)$_2$, —OP[OSi(R$^1$)$_3$]$_2$, —SR$^3$,

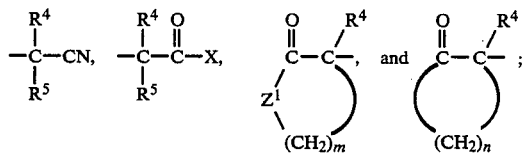

$X^3$ and $X^4$ are independently chosen from the group consisting of H, CH$_3$ and CH$_2$CH$_3$; $a$ is an integer greater than or equal to 3; and mixtures thereof. All remaining symbols are as defined above.

It is readily apparent that the members of the group defining $Z^3$ and $Z^4$ are the same as the first five members of the aforesaid group defining $Z^1$ and $Z^2$ and are cyano or keto forms of $Z^1$ and $Z^2$. The "living" polymers contain bridging groups >M(R$^1$)(R$^2$) at their "living" ends.

The "living" polymer of the invention can be a ladder homopolymer derived from a single difunctional monomer species or a ladder copolymer derived from more than one difunctional monomer species. The "living" polymer of this invention can also be a block copolymer containing homopolymeric or copolymeric ladder sections and homopolymeric or copolymeric non-ladder sections:

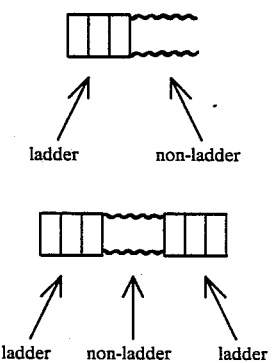

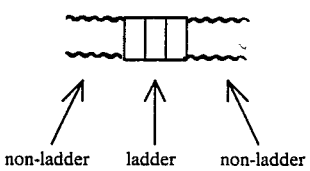

Ladder-armed stars can also be prepared by attaching "ladder arms" prepared by the process of this invention to a "star core", as described by Spinelli, U.S. Pat. No. 4,659,783.

The monomers used in this reaction must provide the ladders with rungs having at least 7 atoms therein. It has been determined, as illustrated below in Experiment 1 and Example 11, that a minimum number of chain atoms between the ester or amide groups is required to maintain the rung structure of the ladders. This number is 7 atoms, including the carbonyl carbons of the ester or amide groups.

Preferred monomers for this purpose are unsaturated esters of diols and/or dithiols, particularly such esters of α-methylene-carboxylic acids, for example, diethyleneglycol dimethacrylate, triethyleneglycol dimethacrylate, tetraethyleneglycol dimethacrylate, 1,3-propanediol dimethacrylate, 1,4-butanediol dimethacrylate, 1,5-pentanediol diacrylate, hexamethylene diacrylate, hexamethylene dimethacrylate, 1,4-cyclohexanediol diacrylate, 1,4-benzendiol diacrylate, (±)—2,2'-((1,1'-binaphthalene)2,2'-diylbis(oxy))bis-2-ethanol diacrylate, (±)—2,3'-((1,1'-binaphthalene)-2,2'-diylbis(oxy))bis-2-ethanol dimethacrylate, 1,4-bis(3-methacryloxypropyl-dimethylsilyl)butane, 1,2-bis(2-methacryloxy-ethoxydimethylsilyl)ethane, the bis-acrylates and bis-methacrylates of polyethylene glycols of molecular weight 200–500; and unsaturated N-alkylated amides, such as 1,6-hexamethylene bis-(N-methylmethacrylamide), bis(α-N-methylmethacrylamidopropoxy)-ethane; and mixtures thereof. Chiral difunctional monomers, such as the substituted binaphthols above, impart additional tertiary structure to the resultant ladder polymers.

Substituents which are unreactive under polymerizing conditions include those having oxygen-, nitrogen-, or silicon-containing groups which are devoid of reactive hydrogens. Groups such as —OSi(R$^1$)$_3$, —CONH$_2$, —CO$_2$R$^8$, —NR'R", —CO$_2$NR'R", —CN, —CH=CH$_2$, —P(O)(OR)$_2$ and —C(O)R$^8$ are nonreactive under such conditions and, therefore, can be tolerated. On the other hand, groups such as —CO$_2$H and —OH are reactive under polymerizing conditions and must be chemically protected (i.e., deactivated) to be useful substituents in the preparation of ladder polymers. Monomers which contain sufficiently sterically hindered amine and alcohol groups that remain inert under reaction conditions may be used directly without deactivation. In the aforesaid substituents, R$^8$ is a C$_{1-12}$ hydrocarbyl radical which is aliphatic, aromatic or mixed aliphatic-aromatic, and R, R', R" and R$^1$ are as defined above. Preferred substituents are —CO$_2$R$^8$, —CH=CH$_2$, —NR'R", and chemically protected —CO$_2$H and —OH.

The initiators used in the invention are either known compounds or can be prepared by known methods from known starting materials. Examples of preferred initiators include bis[(1-methoxy-2-methylpropenyl)oxy]-dimethylsilane (BMPDMS), which is prepared by the reaction of methyl isobutyrate with lithium diisopropylamide, followed by addition of dichlorodimethylsilane.

The co-catalysts used in this invention process are either known compounds or can be prepared by known methods from known compounds. Effective co-catalysts for use in the present invention include sources of fluoride, bifluoride, cyanide or azide ions. Specific suitable and preferred co-catalysts have been disclosed in the art (e.g., U.S. Pat. No. 4,508,880). Tris(dimethylamino)sulfonium bifluoride is especially preferred.

In an alternate process for preparing ladder polymers, the initiator/catalyst system described above can be replaced by a difunctional Ti-, Zr- or Hf-containing initiator of the kind described in U.S. 4,728,706. Preferred Ti-, Zr-, and Hf-containing initiators are selected from the tetracoordinate organotitanium organozirconium and organohafnium compounds of the formula $(R^4)_2MZ_2$ described in U.S. 4,728,706 (col. 5, line 7 to col. 6, line 25), where $R^4$, M and Z are defined as in U.S. 4,728,706.

Critical to the formation of ladder polymers is the maintenance of a low concentration of reactants. This is achieved by starting with dilute (less than about 20 mM) initiator solutions and by adding monomer slowly so that the concentration of free monomer remains low. Ideally, the rate of addition should be less than or equal to the rate of reaction of the monomer with the initiator or growing ladder polymer to attain polymerization conditions under "high dilution." In this way, undesirable side reactions which lead to branching and cross-linking can be minimized. In general, as the desired molecular weight of the ladder polymer increases, the initial initiator concentration and the rate of monomer addition should be decreased to avoid polymer defects. However, at extremely slow addition rates, death of the "living" end of the polymer can result in incomplete polymerization.

The moment is dissolved or dispersed in the solvent at a concentration of about 1 wt % to about 20 wt %. The co-catalyst is normally present in such an amount that the molar ratio of initiator to co-catalyst is in the range of 0.1 to 10,000, preferably 10 to 100. It has been determined that molecular weights of the resulting polymers are controlled by the relative amounts of initiator and monomer.

Suitable solvents are aprotic liquids in which the monomer, initiator and co-catalyst are sufficiently soluble for reaction to occur; that is, the materials are dissolved at the concentrations employed. Suitable solvents include ethyl acetate, propionitrile, toluene, xylene, bromobenzene, dimethoxyethane, diethylether, tetramethylene sulfone, N,N-dimethylformamide, N,N-dimethylacetamide, N-methylpyrrolidone, anisole, 2-butoxyethoxytrimethylsilane, cellosolve acetate, acetonitrile, and tetrahydrofuran. Acetonitrile and tetrahydrofuran are preferred solvents when a co-catalyst wherein the active species is an anion is used.

The process of the invention is carried out at about −100° C. to about 150° C., preferably about 0° C. to 50° C.; most preferably at ambient temperature.

The final (non-living) polymeric product obtained by means of the process of the invention is formed by quenching the "living" polymer with an active hydrogen sources (e.g., acid, water or an alcohol) or an acylating agent (e.g., an acyl chloride, acyl fluoride, aryl ether, or carboxylic anhydride). The quenched polymer is of the form:

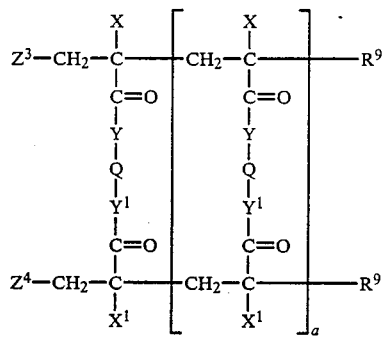

where $R^9$ is chosen from H and $C(O)R^{10}$; where $R^{10}$ is $C_{1-12}$ hydrocarbyl radical which is aliphatic, aromatic or mixed aliphatic-aromatic and is derived from the corresponding acylating agent.

Both "living" and quenched ladder polymers are soluble in common organic solvents, implying little or no crosslinking. The ladder polymers have unusually high Tg and thermal stability compared to conventional acrylic polymers or "stars". Further, the molecular weight ($\overline{M}_n$) of a ladder polymer is predictable from molar monomer/initiator (M/I) ratios used, and hydrolysis of said polymers (which removes the ester-linked rungs) leads to a product whose molecular weight is just half the original weight. This is in stark contrast to the highly cross-linked structures of the prior art (including "stars"), which are expected to suffer a far greater reduction in molecular weight on hydrolysis.

The utility of acrylic ladder polymers resides in their relative tractability (processability), high Tg and thermal stability. They can be used in high temperature plastics, high performance coatings, composites, films and membranes. Block copolymers are generally more easily processed than ladder homopolymers; plasticizers can be added to further enhance the processability of the ladder polymers. Ladder polymers containing chiral rungs can be used in liquid membranes.

In the following examples of specific embodiments of this invention, parts and percentages are by weight and temperatures are in degrees Celsius unless otherwise specified. The molecular weights were determined by gel permeation chromatography (GPC) based on calibration data obtained via light scattering and osmometry on the polymers. The polydispersity (D) of the polymer products of the examples is defined by $D = \overline{M}_w/\overline{M}_n$. Unless otherwise specified, the "living" polymer products obtained in the invention process were quenched by exposure to moist air before molecular weights were determined. All equipment was dried in a 155° C. oven and cooled under nitrogen. All material transfers after drying were done by syringe or other method that avoided contact with air. After purification, monomers were particularly sensitive to radical polymerization so small amounts of radical polymerization inhibitor, phenothiazine (PTZ) were added.

EXAMPLES

Comparative Experiment

Attempted Polymerization of Ethyleneglycol Dimethacrylate

This experiment shows that ladder polymers with rungs containing 6 atoms or less cannot be made by the process of this invention.

A 50-mL 3-necked flask fitted with an argon inlet, a syringe pump, a stirrer and a thermocouple was charged with tetrahydrofuran (THF, 25 mL), bis[(1-methoxy-2-methylpropenyl)oxy]dimethylsilane (BMPDMS, 0.52 g, 2 mmol) and tris(dimethylamino)-sulfonium bifluoride (TASHF$_2$, 0.02 mL of 1 M. in acetonitrile). Then ethyleneglycol dimethacrylate (EGDMA, 1.98 g, 10 mmol) was added dropwise. The temperature rose from 25° C. to 29° C. and remained constant for several hours. The mixture was stirred overnight, whereupon an insoluble polymer was isolated.

Examination of CPK molecular models revealed that the expected ladder rungs were too short and that the minimum number of atoms required to maintain a ladder shape was 7-8 atoms.

EXAMPLE 1

Polymerization of Hexamethylene Dimethacrylate (HMDMA)

The procedure of the comparative Example was followed using HMDMA (10.17 g, 40 mmol), BMPDMS (1.04 g, 4 mmol), TASHF$_2$ (0.02 mL, 1 M. in MeCN) and THF (50 mL). During monomer addition, the temperature rose from 25° C. to 29° C. and remained constant for several minutes. The mixture was stirred for 1 hour during which the temperature rose very slowly to 30.4° C. and some insoluble particles began to form. The reaction was immediately stopped by addition of methanol and the solvents were evaporated. The residue was dried and found to be soluble in acetone and chloroform. Proton NMR showed the presence of ladder polymer and some unreacted monomer (since the reaction was stopped before it could reach completion).

The appearance of insoluble particles was due to gel formation and it was reasoned that since ladder polymer formation is similar to cyclopolymerization, high dilution conditions might be desirable.

EXAMPLE 2

Polymerization of HMDMA in Dilute Solutions

A 1-liter 3-necked flask equipped as described in Example 1 was charged with BMPDMS (1.04 g, 4 mmol), THF (250 mL) and TASDF$_2$ (0.1 mL, 1 M. in CD$_3$CN). Then a solution of a mixture of HMDMA (10.17 g, 40 mmol) and TASHF$_2$ (0.1 mL, 1 M. in CD$_3$CN) in 250 mL of THF was added dropwise over 3 hours. The temperature rose gradually to 26.6° C. from 25.6° C. throughout the addition process. The mixture was stirred overnight and evaporated. The residue was dissolved in acetone and added to hexane to give a precipitate which was collected by filtration and dried to give a white powdery polymer. Yield 9.25 g, $^1$H NMR (δ, ppm): 4.08 (OCH$_2$), 3.67 (OCH$_3$), 1.17–2.5 (CH$_2$, broad), 0.5–1.4 (CH$_3$, broad). Using the areas under peaks corresponding to OCH$_2$ (from polymer) and OCH$_3$ (from initiator), the ratio of methacrylate units to initiator residue was calculated to be 10.6 (theory 10.0). This implies a molecular weight of 2899 (theory 2747). GPC Analysis: $\overline{M}_n$ 2670, $\overline{M}_w$ 4550, D 1.71.

Elemental analysis:
Calc'd. from C$_{150}$H$_{239}$O$_{44}$: C 65.60, H 8.77, O 25.63
Found: C 65.60, H 9.02, O 25.62.

The polymer was soluble in chloroform, dichloromethane, acetone, toluene and ethyl acetate. The NMR, elemental, and GPC analyses, together with the solubility properties suggest the absence of crosslinks and are consistent with the proposed ladder structure. Thermal analysis: Onset temperature (TGA in nitrogen), 352° C. with less than 1% residue at 500° C.; onset temperature (TGA in air), 304° C. with no residue at 500° C.; T$_g$ (DSC) 132° C. and maximum degradation temperature (MDT) 387° C.

EXAMPLE 3

Polymerization of HMDMA in Dilute Solution

This Example demonstrates molecular weight control by monomer/initiator ratio.

The procedure of Example 2 was repeated using HMDMA (20.34 g, 80 mmol), BMPDMS (1.04 g, 4 mmol), THF (500 mL), and TASHF$_2$ (0.10 mL, 1 M. in MeCN). Normal workup gave 17.55 g of polymer: $\overline{M}_n$ 4370 (theory 5289), $\overline{M}_w$ 12,300, D 2.81. [Correction for a high molecular weight shoulder in the GPC chromatogram gave $\overline{M}_n$ 4370, $\overline{M}_w$ 6310, D. 1.44].

Calc'd. for C$_{290}$H$_{459}$O$_{84}$: C 65.85, H 8.75, O 25.40;
Found: C 65.72, H 8.62, O 25.66.
Onset temperature in TGA, 330° C. in air and 346° C. in nitrogen.
Residue, 0% at 500° C. in air, less than 1% at 500° C. in nitrogen.

EXAMPLE 4

Polymerization of Hexamethylene Diacrylate (HMDA)

The procedure of Example 2 was followed using BMPDMS (1.04 g, 4 mmol), HMDA (20.34 g), THF (500 mL), TASHF$_2$ (0.2 mL, 0.1 M. in MeCN). Evaporation followed by washing with hexane gave 0.56 g of polymer. $\overline{M}_n$ 4780, $\overline{M}_w$ 19,700, D 4.12.

EXAMPLE 5

Polymerization of HMDMA in High $\overline{M}_w$

The procedure of Example 2 was followed using BMPDMS (0.60 mL, 2 mmol), HMDMA (20.34 g, 80 mmol), TASHF$_2$ (0.10 mL in MeCN), and THF (500 mL). The temperature rose from 25.8° C. to 29.6° C. Normal workup gave 20.0 g of polymer. $\overline{M}_n$ 14,900, $\overline{M}_w$ 384,000, D 25.75; intrinsic viscosity, [η], 0.114 in THF (25° C.).

EXAMPLE 6

Preparation of an ABA Block Copolymer of n-Butyl Methacrylate and HMDMA of High Molecular Weight A 1-liter 3-necked flask equipped as in Example 2 was charged with THF (200 mL), BMPDMS (0.6 mL, 2 mmol), and TASHF$_2$ (0.05 mL, 1 M. in MeCN). A mixture of HMDMA (20.34 g) and TASHF$_2$ (0.05 mL, 1 M. in MeCN), in 300 mL THF was added dropwise until half of the solution was in the reactor. The addition was interrupted at this point. The temperature rose slowly from 25.8° C. to 27.8° C. during the addition. When the temperature dropped to 26° C., n-butyl methacrylate (28.44 g, 200 mmol) was added dropwise. The temperature rose further from 26° C. to 27.8° C. during the addition of n-butyl methacrylate. More TASHF$_2$ (0.05 mL) was added, whereupon the temperature rose further to 31.8° C. When the temperature began to drop, the second batch of HMDMA was added dropwise. At the end of the addition, more TASHF$_2$ (0.05 mL) was added and the temperature rose to 29.2° C. from 28.2° C. The mixture was stirred overnight to give 48.7 g (quantitative) of white powder after normal workup. $\overline{M}_n$ 46,200, $\overline{M}_w$ 72,700, D 1.57; intrinsic viscosity [η], 0.29 dl/g at 25° C. in THF. The polymer was completely soluble in common organic solvents. The fact that the yield was quantitative is an indication that the method gave the desired HMDMA/BMA/HMDMA block copolymer and that a living polymer is formed.

EXAMPLE 7

Preparation of an AB Block Copolymer of Lauryl Methacrylate (LMA) and Diethyleneglycol Dimethacrylate (DEGDMA)

A reactor similar to that of Example 6 was charged with THF (250 mL), TASHF$_2$ (0.1 mL, 1 M. in MeCN), and BMPDMS (0.6 mL, 2 mmol). Then a solution of DEGDMA (20 g, 80 mmol) in 250 mL of THF containing TASHF$_2$ (0.05 mL, 1 M. in MeCN) was added dropwise. The temperature rose gradually from 26.6° C. to 29.6° C. The mixture was stirred until the exotherm subsided. Then lauryl methacrylate (15.0 g, 59 mmol) was added, followed by addition of TASHF$_2$ (0.05 mL). The temperature rose to 32.2° C. and the mixture was stirred overnight. Normal workup gave 31 g of polymer. $\overline{M}_n$ 16,3000, $\overline{M}_w$ 91,600, D 5.63. Inherent viscosity, ηinh, 0.18 dL/g.

EXAMPLE 8

Polymerization of Diethyleneglycol Dimethacrylate (DEGDMA)

The procedure of Example 2 was followed using a solution of DEGDMA (12.6 g, 50 mL) in 180 mL THF containing TASHF$_2$ (0.1 mL, 1 M. in MeCN), BMPDMS (0.6 mL, 2 mmol), and additional THF (70 mL in the reactor initially) containing additional TASHF$_2$ (0.1 mL, 1 MeCN). Normal workup gave 12.5 g of polymer. $\overline{M}_n$ 3590, $\overline{M}_w$ 12,700, D 3.53; Tg 166°; ηinh, 0.07 dL/g.

EXAMPLE 9

Preparation of an AB Block Copolymer of DEGDMA/2-Ethylhexyl Methacrylate (EHMA)

The procedure of Example 7 was followed using a solution of DEGDMA (20 g) in 200 mL THF, a mixture of BMPDMS (0.3 mL, 1 mmol) and TASHF$_2$ (0.05 mL in MeCN) in 100 mL THF, and 2-ethylhexyl methacrylate (EHMA, 20 g). During the addition of DEGDMA solution, an additional 0.03 mL of TASHF$_2$ (1 M. in MeCN) was used. During addition of EHMA, 0.1 mL of TASHF$_2$ was used. A total of 105 mL of DEGDMA solution was used. Normal workup gave 22.3 g of polymer. $\overline{M}_n$ 39,900, $\overline{M}_w$ 3,004,000, D 75.25 (bimodal peak); intrinsic viscosity, 0.38 dL/g.

EXAMPLE 10

Polymerization of 1,4-Butanediol Dimethacrylate

Following the procedure of Example 2, a solution of 1,4-butanediol dimethacrylate (13 g) in THF (200 mL) containing TASHF$_2$ (0.05 mL, 1 M. in MeCN) was added to a mixture of BMPDMS (0.1 mL) and TASHF$_2$ (0.05 mL, 1 M. in MeCN) in THF (50 mL). Normal workup gave 1.38 g of polymer.

EXAMPLE 11

Polymerization of 1,3-Propanediol Dimethacrylate

Following the procedure of Example 2, a solution of 1,3-propanediol (13 g) in 200 mL THF containing 0.05 mL TASHF$_2$ (1 M in MeCN) was added to a mixture of BMPDMS (0.1 mL) and TASHF$_2$ (0.05 mL, 1 M. in MeCN) in 50 mL THF. Normal workup gave 6.67 g of polymer.

EXAMPLE 12

Polymerization of Tetraethyleneglycol Dimethacrylate

Following the procedure of Example 11 and replacing 1,3-propanediol by tetraethyleneglycol dimethacrylate (25 g) and using two 0.1-ml aliquots of TASHF$_2$ (1 M. in MeCN), 2.26 g of polymer were obtained.

EXAMPLE 13

Preparation of an ABA Block Copolymer of HMDMA/EHMA/HMDMA

A 1-liter flask fitted as described in Example 1 was charged with tetrahydrofuran (50 mL), BMPDMS (0.60 mL, 2.0 mmol) and TASHF$_2$ (0.02 mL, 1 M. in MeCN). Then a solution of HMDMA (5 g) in THF (75 mL) was added at 1 mL/min. The temperature of the mixture rose from 24.8° C. to 26.2° C. The mixture was stirred for 1 hr (after addition was complete) followed by sequential addition of TASHF$_2$ (0.01 mL, 1 M. in MeCN) and 2-ethylhexyl methacrylate (20 g, dropwise over 1 hr). The temperature rose from 25.2° C. to 31.4° C. The mixture was stirred until the exotherm subsided. Then TASHF$_2$ (0.01 mL, 1 M in MeCN) was added followed by addition of a solution of HMDMA (5 g) in THF (75 mL), whereupon the temperature rose to 27° C. from 25° C. The mixture was stirred overnight, evaporated and dried to give 31.2 g of polymer. This was redissolved in acetonitrile (100 mL) and precipitated from water to give 29.2 g of white powder after drying at 100° C./0.1 Torr. $\overline{M}_n$ (VPO, toluene at 50° C.) 19,800. $M_n$ (calcd.) 15,350.

EXAMPLE 14

Preparation of Ladder-Armed Star

To a 3-necked, 1-liter flask equipped as described before were added THF (250 mL), BMPDMS and tetrabutylammonium (TBA) bibenzoate (0.50 mL, 0.1 M. in THF). Then a solution of HMDMA (20.34 g, 80 mmol) in THF (250 mL) containing TBA bibenzoate (1 mL, 0.1 M in THF) was added at 4 mL/min. After the addition was complete, the mixture was stirred for 1 hr and ethylene glycol dimethacrylate (EGDMA, 3.2 g, 16 mmol) was added to produce a star-shaped material. This was followed by addition of more bibenzoate (0.50 mL).

The stirring was continued for an additional 2 hours followed by addition of more bibenzoate (0.2 mL). Then an aliquot (227.03 g) of the mixture was removed with a syringe, poured into methanol, evaporated and dried to give 12.99 g of polymer. Intrinsic viscosity measured in toluene was 0.088 dL/g. Proton NMR was consistent with desired structure. Gel permeation chromatography (GPC) gave $\overline{M}_w$=87,500 with peak molecular weight ($\overline{M}_p$) of 69,000, and showed that loose ladder arms (unattached to the star's core) were present up to 19%. Light scattering gave $\overline{M}_w$ =470,000 with a hydrodynamic volume of 204 Å. Differential scanning calorimetry (DSC) gave $T_g$ =176.1° C. while thermographic analysis (TGA) gave maximum decomposition temperature (MDT) as 426.7° C. (nitrogen) and 318.4° C. (air). TGA was performed and the volatile materials were trapped and analyzed by GC/MS. It was found that the polymer held onto solvent (THF) at temperatures below $T_g$.

To the remaining solution was added more EGDMA (0.75 mL) in an attempt to reduce the amount of loose arms. The mixture was stirred for 1 hr and quenched with MeOH. Evaporation and drying gave 14.81 g of polymer. Proton NMR showed the presence of residual unreacted EGDMA. However, GPC showed that the amount of loose arms had been reduced from 19% to 10%. Viscosity measurement in toluene gave $[\eta]$=0.095 which showed an increase in molecular weight. GPC gave $\overline{M}_w$=131,000 and $\overline{M}_p$=83,000 while light scattering gave $\overline{M}_w$=690,000 with hydrodynamic volume of 262 Å. $T_g$ (DSC) 173° C. and MDT (TGA) =418° C. (nitrogen) and 295° C. (air). This material also held onto solvent (THF) below Tg as determined by TGA/GC/MS analyses. The difference in the observed $\overline{M}_w$ determined by GPC and light scattering is due to the fact that multi-armed stars are more compact and hence have lower molecular volume (the basis for GPC molecular weight determination) than the corresponding linear chains. Furthermore, the calibration curves used were determined using linear polymers.

EXAMPLE 15

Preparation of Films for Mechanical Testing

To a solution of desired polymer (2 g) in dichloromethane (5 mL) was added the desired plasticizer of known amount (see Table 1 below). The solvent was evaporated and the residue dried to give a homogenous material which was pressed into a film.

TABLE 1

Characteristics of Ladder Films

| Polymer | Plasticizer w/w % | Film Nature | Tensile Modulus | Toughness | Tensile Strength |
|---|---|---|---|---|---|
| A | 25 | soft, tacky | — | — | — |
| B | 25 | brittle | — | — | — |
| C | 25 | flexible | 19,000 | 210 | 550 |
| D | 25 | soft, tacky | — | — | — |
| E | 25 | brittle | — | — | — |
| F | 5 | flexible soft | — | — | — |
| G | 5 | flexible | — | — | — |
| H | 5 | flexible | 42,000 | 5 | 580 |
| I | 5 | flexible | 30,000 | 23 | 380 | where,
Polymer A = P(DEGMA/LMA); 91,600 $\overline{M}_w$
Polymer B = P(HMDMA); 384,000 $\overline{M}_w$
Polymer C = P(HMDMA/BMA/HMDMA); 72,700 $\overline{M}_w$
Polymer D = P(HMDMA/EHMA/HMDMA); 38,600 $\overline{M}_w$
Polymer E = P(HMDMA); 57,200 $\overline{M}_w$
Polymer F = P(DEGMA/LMA); 91,600 $\overline{M}_w$
Polymer G = P(HMDMA/EHMA/HMDMA); 38,600 $\overline{M}_w$
Polymer H = P(HMDMA); 57,200 $\overline{M}_w$/P(BMA); 76,000 $\overline{M}_w$ [50:50 blend]
Polymer I = P(HMDMA); 57,000 $\overline{M}_w$/P(BMA); 76,000 $\overline{M}_w$ [50:50 blend]
and the plasticizer is tritolylphosphate.

EXAMPLES 16-27

Preparation of Ladder Polymers of Varying Structure Using Different Catalysts

A dry, 3-necked, 1-liter flask, equipped with a magnetic stirrer, thermocouple, addition funnel and argon inlet was charged with 400 mL of tetrahydrofuran (THF), and catalyst (0.10 mmol) dissolved in an appropriate solvent (see Table 2). Then the initiator (1.04 g, 4.0 mmol) was added. This was immediately followed by simultaneous addition of monomer (80 mmol, dissolved in 200 mL of THF) and 50 mL solution of additional catalyst (50 mL of 0.20 M. in 10:90 MeCN:THF) slowly over 2 hours. The mixture was stirred overnight and evaporated to dryness. The residue was dissolved in dichloromethane and then added to hexane to precipitate the polymer. The polymer was collected as a white powder and the precipitation repeated two more times. After drying at 100° C., 89–100% yield of polymer was obtained. In general, polymer weights were higher than expected from theory due to the polymer holding strongly onto solvent. The solvent is removable only at temperatures higher than the glass transition temperature. Each polymer sample was characterized by nuclear magnetic resonance spectroscopy, DSC, GPC, TGA, Instron and VPO.

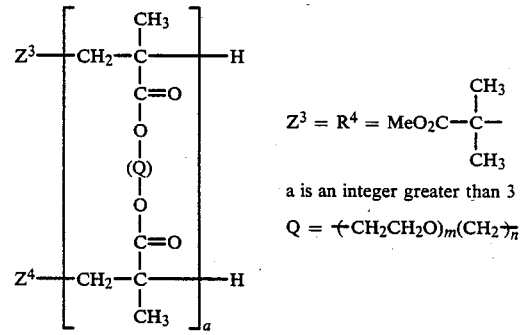

| Exp. No. | Q | Cat/Solv | % Yield | Theo. MW | GPC $M_w/M_n$ | $M_p$ | VPO $M_n$ | DSC $T_g$ | TGA MDT |
|---|---|---|---|---|---|---|---|---|---|
| 16 | m = 1, n = 2 | TASHF$_2$/MeCN | 100 | 5054 | 8860/3520 | 5700 | 3800 | 166 | 390 |
| 17 | m = 2, n = 2 | TASHF$_2$/MeCN | 100 | 5924 | 5070/2940 | 4300 | 5200 | 139 | 393 |
| 18 | m = 3, n = 2 | TASHF$_2$/MeCN | 100 | 6804 | 9360/4710 | 6600 | 7100 | 104 | 398 |
| 19 | m = 0, n = 5 | TASHF$_2$/MeCN | 98 | 5004 | 13800/4560 | 8600 | 7400 | 176 | 420 |
| 20 | m = 1, n = 2 | Bu$_4$NO$_2$CPh/THF | 100 | 5054 | 7970/3500 | 4100 | 6600 | 166 | 402 |
| 21 | m = 1, n = 2 | Bu$_4$NO$_2$CC$_6$H$_4$Cl-m/THF | 100 | 5054 | 7740/3810 | 4200 | 4200 | 154 | 410 |
| 22 | m = 1, n = 2 | CH$_3$CO$_2$NBu$_4$/THF | 100 | 5054 | 6230/3260 | 3700 | 4100 | 153 | 402 |
| 23 | m = 0, n = 5 | C$_6$H$_5$CO$_2$NBu$_4$/THF | 100 | 5004 | 12100/4390 | 5600 | 7600 | 154 | 438 |
| 24 | m = 0, n = 5 | m-ClC$_6$H$_4$CO$_2$NBu$_4$/THF | 100 | 5004 | 9840/4300 | 5700 | 5200 | 151 | 436 |

-continued

| Exp. No. | Q | Cat/Solv | % Yield | Theo. MW | GPC $M_w/M_n$ | $M_p$ | VPO $M_n$ | DSC $T_g$ | TGA MDT |
|---|---|---|---|---|---|---|---|---|---|
| 25 | m = 0, n = 5 | CH$_3$CO$_2$NBu$_4$/THF | 100 | 5004 | 8860/3780 | 4800 | 5700 | 161 | 431 |
| 26 | m = 0, n = 6 | TASHF$_2$/MeCN | 100 | 5279 | 4600/5780 | 8100 | 10300 | 172 | 418 |
| 27 | m = 0, n = 5 | TASHF$_2$/MeCN .07 mmol | 100 | 5095 | 16100/7600 | 12000 | 10200 | — | — |

EXAMPLE 28

Ladder Polymers as Liquid Membranes

The polymer (P(DEGDMA), $\overline{M}_w$ 12,700, Tg 167° C., $\eta$ =0.07; 0.5 g) was dissolved in CDCl$_3$ (1.0 mL), and KSCN (3 g) was dissolved in D$_2$O (2.0 mL) in a separate vial. The two solutions were mixed, shaken for 1 hr and allowed to separate completely into two layers. Using a clean syringe, the top layer was removed and saved. The lower layer was similarly removed, taking care not to contaminate this with any aqueous layer at the interface. Infrared spectrum of the bottom layer showed peaks corresponding to both complexed and uncomplexed KSCN. This suggests that ladder polymers having ethylenoxy groups (similar to crown ethers) are complexing agents and can serve as liquid members for transport of ions.

EXAMPLE 29

Three different polymers of very high molecular weights were prepared from HMDMA and characterized as described below. These Examples and Example 30 illustrate that, where exact molecular weight control is not critical, solutions of reagents can be predried using initiator only (for monomer solutions) or initiator in combination with catalyst for others. In Examples 29–31, the catalyst was 1 M. TASHF$_2$ in acetonitrile.

Polymer 29A

To a 500 mL 3-necked round bottom flask equipped with a magnetic stirrer and septum and under nitrogen were added 300 mL of THF, 0.50 mL of bis(dimethylamino)methylsilane (BDMS) and 10 μL of TASHF$_2$ (1.0 m NMeCN) solution. A solution containing 25 mL HMDMA, 0.15 mL BDMS and 100 μL of a 1% solution of PTZ in THF was prepared for use as monomer solution. A solution containing 10 mL of THF, 1.0 mL acetonitrile, 200 μL of TASH$_2$ (1.0 M. NMeCN) and 10 μL of catalyst of BDMS was also prepared for use as catalyst solution.

The solutions was allowed to stand for 4 hours to allow for complete drying of all solutions. Then 66 μL of BMPDMS and 25 μL of the catalyst solution were added to the flask. Then with stirring 20 mL of the above HMDMA solution was added at a rate of about 0.69 mL/hr. The next morning the viscous solution, which had no sign of gel, was added dropwise to 1200 mL of methanol and the polymer precipitated. The solid was separated by centrifugation and washed three times with methanol. It was dried at 60° C. in a vacuum over. The yield of polymer was 15.6 g.

Polymer 29B

Polymer 29B was made in the same way as Polymer 29A except 132 μL of BMPDMS was used. The Polymer 29B solution, which contained no visible gel, was added dropwise to 1200 mL of methanol, the polymer isolated by centrifugation was washed two times with methanol. The polymer was dried at 60° C. under vacuum. The yield of polymer was 19.3 g.

Polymer 29C

Polymer 29C was made in the same way as Polymer 29A except 132 μL of BMPDMS and 10 mL of the HMDMA solution were used. The polymer 29C solution, which had no visible gel, was added dropwise to 1200 mL of methanol and the precipitated polymer was isolated by centrifugation, washed two times with methanol and dried at 60° C. in a vacuum oven. The yield of polymer was 9.6 g.

All three of the above polymers were subjected to a variety of tests, the results of which are tabulated below.

|  | 29A | 29B | 29C |
|---|---|---|---|
| % C | 68.09 | 66.06 | 65.66 |
| % H | 8.54 | 8.60 | 8.61 |
| $M_n$ (osomometry) | 122,000 | 73,000 | 49,000 |
| $M_w$ (light scattering) | 532,000 | 232,000 | 85,000 |
| Glass Transition Temperature | — | 208 | — |

Thermogravimetric analysis of the polymers indicated they were quite stable, having less than 5% weight loss at 250° C. in air and 300° C. in nitrogen. An infrared spectrum was in accord with the polymer structure. The polymers redissolved in THF. The molecular weights of the polymers decreased as the amount of initiator used was increased, showing that, relatively, the molecular weight was being controlled by the amount of initiator used.

EXAMPLE 30

Polymer 30A

The same procedure was used as in Polymer 29A, except tetraethyleneglycol dimethacrylate (TREGDMA) was used instead of HMDMA, in the THF-acetonitrile-catalyst-BDMS solution 0.5 mL of acetonitrile was present and only 2.5 mL of this solution was used, 132 μL of BMPDMS was used and only 10 mL of the TREGDMA solution was used.

The clear polymer solution was added dropwise to 1200 mL of hexane. The precipitated polymer was isolated by centrifugation, washed twice with hexane and dried in a vacuum over at 60° C. The yield of polymer was 10.5 g.

Polymer 30B

The same procedure was used as in Polymer 29A except TREGDMA was used instead of HMDMA, in the THF-acetonitrile-catalyst-BDMS solution 0.5 mL of acetonitrile was present, and 132 μL of BMPDMS was used.

The clear polymer solution was added dropwise to 1200 mL of hexane. The precipitated polymer was isolated by centrifugation, washed twice with hexane and dried in a vacuum oven at 60° C. The yield of polymer was 19.4 g.

The properties of the polymers are given below:

|  | 30A | 30B |
| --- | --- | --- |
| % C | 57.99 | 58.17 |
| % H | 7.45 | 7.62 |
| $\overline{M}_n$ (GPC) | 18,800 | 39,000 |
| $\overline{M}_w$ (GPC) | 45,800 | 157,000 |
| Glass Transition Temperature | — | 188° C. |

Thermogravimetric analysis showed 30B was thermally stable, losing less than 5% of its weight up to 225° C. in air and up to 325° C. in nitrogen. The polymers redissolved in THF.

EXAMPLE 31

Copolymerization of DEGDMA and TREGDMA

To a 2000 mL three necked round bottom flask equipped with magnetic stirrer and septum and under nitrogen were added 1600 mL of THF, 1.0 mL of BDMS and 20 μL of TASHF$_2$ (1.0 M. NMeCN). The following solutions were prepared.

| 1. | 30 mL of DEGDMA |
|    | 0.18 mL BDMS |
|    | 120 μL of 1% PTZ in THF |
| 2. | 30 mL TREGDMA |
|    | 0.18 mL BDMS |
|    | 120 μL of 1% PTZ in THF |
| 3. | 30 mL THF |
|    | 1.0 mL acetonitrile |
|    | 0.4 mL TASHF$_2$ (1.0 M NMeCN) |
|    | 20 μL BMPDMS |

Four hours after the THF was put in the 2000 mL flask, 0.5 mL of BDMS and 50 μL of catalyst solution 3 were added. Then 20 mL of solution 1 and 20 mL of solution 2 were mixed in a syringe and that mixture was added to the flask at a rate of 7.7 mL/hour simultaneously with 10 mL of solution 3 at a rate of 1.0 mL/hr.

The next day the clear polymer solution was added dropwise to 2000 mL of hexane. The precipitated polymer was isolated by centrifugation, washed twice with hexane and dried at 60° C. in a vacuum oven. The yield of polymer was 41.4 g.

Analysis of the polymer showed it had $\overline{M}_n$ (GPC) of 21,800 and $\overline{M}_w$ (GPC) of 69,300. There was a single Tg of 202° C. The polymer was soluble in THF.

This example illustrates that a polymer can be made from two different monomers to give a copolymer.

EXAMPLE 32

Ladder Polymer with Silane-Containing Rungs

A. 1,4-Bis(dimethylsilyl)butane

To a stirred mixture of 12 g (0.5 mol) of magnesium turnings in 500 mL of dry ether was added 50 g (0.23 mol, 27.65 mL) of 1,4-dibromobutane at a rate sufficient to maintain a gentle reflux. When the reaction was finished, the reaction solution was transferred by canula to a second solution cooled to −20° C. of 48.26 g (0.51 mol, 55.5 mL) of dimethylchlorosilane in 250 mL of dry ether. The resulting solution was allowed to warm to room temperature, diluted with hexane, and filtered. The filtrate was concentrated in 300 mL, washed with water, dried over magnesium sulfate, concentrated, and distilled in a spinning band column to give 16.6 g of 1,4-bis(dimethylsilyl)butane, bp 55.5°–58.5° C. (13–14 mm). $^1$H NMR (360 MHz, CDCl$_3$): 0.06 (d, J=3.5 Hz, 12 H, SiMe), 0.6 (m, 4 H, CH$_2$Si), 1.39 (m, 4 H, CH$_2$).

B. 1,4-Bis(3-hydroxypropyldimethylsilyl)butane

To a stirred mixture of 38.14 g (0.293 mol) of 3-trimethylsiloxy-1-propene and 0.4 g of 5% Rh/C and 0.8 g of 5% Pt/C was added 17.81 g (0.102 mol) or 1,4-bis(dimethylsilyl)butane. A temperature rise of 122° C. occurred during 1.5 hr. After refluxing overnight, the mixture was filtered, and the filtrate evaporated under reduced pressure. The residue was diluted with 60 mL of tetrahydrofuran (THF) and 150 mL of methanol, treated with 0.5 mL of 1 M. tetrabutylammonium fluoride in THF and refluxed 18 hr. The solution was evaporated under reduced pressure, and the residue was stored for 24 hr. at 0.1 torr. to give 18.57 g of 1,4-bis(3-hydroxypropyldimethylsilyl)butane. $^1$H NMR (360 MHz, CDCl$_3$): −0.07 (s, 12 H, SiMe), 0.4–0.5 (m, 8 H, CH$_2$Si), 1.15–1.3 (m, 4 H, —CH$_2$CH$_2$—), 1.4–1.55 (m, 4 H, CH$_2$CH$_2$O), 3.4 (s, 1.2 H, OH), 3.56 (t, J=7 Hz, 4 H, OCH$_2$). m/z calcd for (trimethylsilylated sample) C$_{13}$H$_{31}$O$_2$Si$_2$·2TMS—CH$_3$ 419.2653. GC/MS m/z: 419.2623. GC purity 93%. Anal calcd for C$_{14}$H$_{34}$O$_2$Si$_2$: C 57.87, H 11.89, Si 19.33, Found: C 56.97, H 11.89, Si 19.16.

C. 1,4-Bis(3-methacryloxypropyldimethylsilyl)butane

To a stirred solution of 17.01 g (58.5 mmol) of 1,4-bis(3-hydroxypropyldimethylsilyl)butane and 17.94 mL (13.03 g, 128.7 mmol) of triethylamine in 100 mL of dichloromethane was added 12.58 mL (13.46 g, 128.7 mmol) of redistilled methacrylyl chloride at a rate to keep the temperature below 30° C. After stirring for an additional 1 hr., 2 mL of water was added, and the mixture was added to ice water. The organic layer was washed with aqueous sodium bicarbonate and water, dried (magnesium sulfate), and evaporated. The residue was dissolved in 1:1 THF-ether (v/v), treated successively with 3 mL of triethylamine, 2 mL of water, brine, sodium bicarbonate, and brine, and was then dried (magnesium sulfate) and evaporated to give 12.33 g of 1,4-bis(3-methacryloxypropyldimethylsilyl)butane. Anal calcd for C$_{22}$H$_{42}$O$_4$Si$_2$: C 61.92, H 9.92, Si 13.16. Found: C 61.92, H 9.82, Si 12.31. $^1$H NMR (360 MHz, CDCl$_3$): −0.05 (s, 12 H, SiMe), 0.48 (m, 8 H, CH$_2$Si), 1.27 (m, 4 H, CH$_2$), 1.62 (m, 4 H, CH$_2$), 1.92 (s, 6 H, =CCH$_3$), 4.06 (t, J=6 Hz, 4 H, OCH$_2$), 5.52 (s, 2 H, =CH), 6.07 (s, 2 H, =CH).

D. Ladder Polymerization of 1,4-Bis(3-methacryloxypropyldimethylsilyl)butane

To a solution of 0.96 mL (0.8 g, 3.12 mmol) of bis(1-methoxy-2-methyl-1-propenoxy)dimethylsilane and 156 μL of TASHF$_2$ (0.1 M. in acetonitrile) in 50 mL of THF at −10° C. was added a solution of 5.12 g (12 mmol) of 1,4-bis(3-methacryloxypropyldimethylsilyl)butane and 156 μL of TASHF$_2$ (0.1 M. acetonitrile) in 50 mL of THF. After stirring overnight at room temperature, the solution was concentrated to 20 mL under reduced pressure. NMR analysis of an aliquot showed that there was no residual monomer. The polymer was precipitated in methanol as a gum, and was then reprecipitated from dichloromethane in methanol as a gum. After drying at 0.1 torr, poly(1,4-bis(3-methacryloxypropyldimethylsilyl)butane) was obtained as a clear gum. GPC: $\overline{M}_n$ =11,700, $\overline{M}_w$ =101,000, D =8.6 (polysytrene standard). $^1$H NMR (360 MHz, CDCl$_3$): −0.02 (br, s, 12 H, SiMe), 0.5 (br, s, 8 H, CH$_2$Si), 0.8–2.1 (br, m, 21 H, CH$_3$, CH$_2$), 3.91 (m, 4 H, OCH$_2$). $^{13}$C NMR (75.48 MHz, CDCl$_3$): (s, CH$_2$Si), 16–20 (broad m, CH$_3$), 22.8–23.2 (m, CH$_2$), 27.28–27.81 (m, CH$_2$), 44.8–45.14 (m, quat. C), 48–55 (very broad m, backbone CH$_2$), 67–67.48 (m, OCH$_2$), 176.2–178.46 (m, C=O).

EXAMPLE 33

Ladder Polymer with Siloxane-Containing Rungs

A. 1,2-Bis(2-methacryloxyethoxydimethylsilyl)ethane

To a solution of 52 g (50.2 mL, 0.4 mol) of 2-hydroxyethyl methacrylate in 400 mL of anhydrous methylene chloride (dried over 4 Å molecular sieves) and 44.52 g (61.2 mL, 0.44 mol) of triethylamine was added dropwise at a rate to keep the temperature below 35° C. with external cooling, a solution of 21.4 g (0.2 mol) of 1,2-bis(chlorodimethylsilyl)ethane in 60 mL of methylene chloride. The mixture was stirred for 1 hr. at room temperature, and filtered under nitrogen. The filtrate was evaporated, and the residue was treated with hexane and filtered under nitrogen. The filtrate was evaporated under reduced pressure to give 30 g of 1,2-bis(2-methacryloxyethoxydimethylsilyl)ethane. The product was dissolved in hexane, washed 4 times with water, dried (MgSO$_4$), and evaporated. Cacld for C$_{18}$H$_{34}$O$_6$Si$_2$: C, 53.70; H, 8.51; Si, 13.95. Found: C, 53.75; H, 8.53, Si, 13.57. $^1$H NMR (360 MHz, CDCl$_3$, δ ppm): 0.09 (s, 12 H, SiMe), 0.50 (s, 4 H, CH$_2$Si), 1.93 (m, 2 H, CH$_3$C=), 3.81 (m, 4 H, CH$_2$OSi), 4.20 (m, 4 H, O=COCH$_2$), 5.56 (m, 2 H, =CH), 6.11 (m, 2 H, =CH).

B. Ladder Polymerization of 1,2-Bis(2-methacryloxyethoxydimethylsilyl)ethane To 50 mL of anhydrous THF was added 0.30 g (0.36 mL, 1.17 mmol) of bis(1-methoxy-2-methylprop-1-enoxy)dimethylsilane and 156 μL of TASHF$_2$ (0.1 M. in acetonitrile). The solution was cooled to −10° C., and a solution of TASHF$_2$ (0.1 M. in acetonitrile) and 4.83 g (12 mmol) of 1,2-bis(2-methacryloxyethoxydimethylsilyl)ethane and 50 mL of THF was added from a syringe pump at the rate of 0.5 mL per minute. The solution was stirred 8 hr. at 0° C., and concentrated to dryness. Extraction of the residue with hexane gave poly(1,2-bis(2-methacryloxyethoxydimethylsilyl)ethane) as 1.4 g of gum. GPC: (PMMA standard) $\overline{M}_n$ 1840, $\overline{M}_w$ 3250, D =1.77; (polystyrene standard) $\overline{M}_n$ 7070, $\overline{M}_w$ 9960, D =1.41VPO (toluene at 50° C., referenced to polystyrene): $\overline{M}_n$ 4739 (corresponding to a dp of 12). $^1$H NMR (360 MHz, CDCl$_3$, δ ppm): 0.06, 0.11 (2 s, 12 H, SiMe), 0.53 (m, 4 H, CH$_2$Si), 0.75–1.2 (m, 6 H, C—CH$_3$), 1.35–2.3 (very broad s, 3.5 H, CH$_2$), 3.4–4.4 (m, 8 H, CH$_2$O). The NMR spectrum shows that 1% of residual monomer is present.

EXAMPLE 34

Polymerization of Binaphthyl Monomer

A. 2-(2-Chloroethyl)-tetrahydropyran

Dihydropyran (85 g, 1.01 moles) and 0.2 mL of concentrated HCl were added to a 500 mL 3-necked round-bottomed flask equipped with a magnetic stirrer, a thermocouple, a reflux condenser and a nitrogen bubbler. The mixture was cooled to 0° C., and then 2-chloroethan-1-ol (80.5 g, 1.01 moles) was added dropwise at a rate sufficient to maintain the temperature below 10° C. After the addition was complete (about 2 hr.), the mixture was allowed to warm to room temperature and stirred for 1 hr. The clear yellow solution was distilled under vacuum.

B. (±)2,2'-(1,1'-binaphthalene)-2,2'-diylbis(oxy))-bis(2-ethoxy-2-tetrahydropyran)

Sodium hydride (8 g of a 50% in oil dispersion, 167 mmole) and dimethylformamide (DMF, 200 mL) were added to a dry 500 mL 3-necked round-bottomed flask equipped with a magnetic stirrer, a thermocouple, a reflux condenser and a nitrogen bubbler. (±)-1,1'-Bi-2-naphthol (20 g, 70 mmole) was added to the flask, producing copious amounts of gas. 2-(2-Chloroethyl)tetrahydropyran (24 g, 181 mmole) was then added and the resulting mixture was refluxed overnight to give a brown solution. After the mixture was cooled, it was poured into 600 mL of water which was being stirred. The aqueous mixture was washed repeatedly with 100 mL portions of methylene chloride. The organic washings were combined, dried over magnesium sulfate, and stripped of solvent to yield 37.06 g of a tan solid. The solid was dissolved in methylene chloride and filtered through basic alumina. The clear yellow filtrate was evaporated to dryness to yield 31.2 g of a yellow solid.

C. (±)-2,2'-((1,1'-binaphthalene)-2,2'-diylbis(oxy))-bis(ethanol)

(±)-2,2'-((1,1'-binaphthalene-2,2'-diylbis(oxy)bis-(2-ethoxy-tetrahydropyran) (31.2 g) was dissolved in 250 mL of methylene chloride/methanol (1:1), followed by the addition of 20 mL of concentrated HCl. The resulting yellow solution was stirred overnight at room temperature and then 200 mL of 10% aqueous sodium bicarbonate was added. The layers were separated and the aqueous layer was washed with 4×100 mL of methylene chloride. The organic washings were combined with the original organic layer and washed with 4×100 mL water and 100 mL of brine. The organic layer was then dried over magnesium sulfate, filtered and stripped of solvents to yield a tan taffy-like material. This residue was triturated with pentane to yield a white powdery solid. The solid was collected and dried to yield 18.7 g of a white powder. The NMR was consistent with the desired product.

D. (±)-2,2'-((1,1'-binaphthalene)-2,2'-diylbis-(oxy))bis(ethanol) dimethacrylate A 50 mL 3-necked flask fitted with a magnetic stirrer, argon inlet and a thermometer was charged with 2 g of product from Example 34C and 20 mL of methylene chloride. The solution was cooled to 0° C. and then triethylamine (1.62 g) was added. Methacryloyl chloride (1.68 g) was added slowly to the resulting solution. After addition was complete, the mixture was allowed to warm up to room temperature and stirred for 18 hr. The mixture was diluted with methylene chloride (50 mL) and then washed with 2×50 mL water followed by 50 mL of brine. The organic layer was collected, dried over magnesium sulfate, and filtered through neutral alumina. Phenothiazene was added to the filtrate and solvents were removed to yield 2.5 g or a clear viscous oil. The $^1$H NMR spectrum was consistent with the proposed structure.

E. Polymerization of (±)-2,2'-((1,1'-binaphthalene)-2,2'-diylbis(oxy)bis(ethanol) dimethacrylate BMPDMS (260 mg), TASHF$_2$ (100 microliters, 0.1 M. in CH$_3$CH) and THF (125 mL) were added to a dry 250 mL 3-necked round-bottomed flask equipped with a magnetic stirrer, a thermocouple, a reflux condenser and a nitrogen bubbler and the mixture was cooled to 0° C. A solution of (±)-2,2'-((1,1'-binaphthalene)-2,2'-diylbis(oxy))-bis(ethanol) dimethacrylate (2.5 g, 4.9 mmole) and TASHF$_2$ (100 μL, 0.1 M. in CH$_3$CN) in THF (125 mL) were added dropwise (0.5 mL/min) to the solution in the 250 mL flask to give a yellow mixture. This mixture was stirred overnight at 0° C. and then condensed. Hexane was added, and the polymer which precipitated was dried to give 1.91 g of a white powdery solid.

Although preferred embodiments of the invention have been illustrated and described hereinabove, it is to be understood that there is no intent to limit the invention to the precise constructions herein described and it is further understood that the right is reserved to all changes and modifications which fall within the scope of the claims.

What is claimed is:

1. A Group Transfer Polymerization (GTP) process resulting in the formation of ladder polymers comprising contacting, under polymerizing conditions in the presence of a solvent, at high dilution, one or more difunctional monomers or mixtures of difunctional monomers with a difunctional initiator, in the presence of a suitable co-catalyst, and wherein the monomers are added to the initiator at a rate that is slow enough so that the said ladder polymers are not caused to be insoluble in common organic solvents by crosslinking of said ladder polymers.

2. Process of claim 1 wherein the difunctional monomer is of the formula

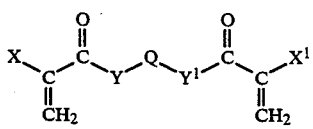

and mixtures thereof wherein

Q is C$_{3-15}$ alkylene or alkyl-substituted alkylene, C$_{4-12}$ cycloalkylene, C$_{6-14}$ arylene or alkyl-substituted arylene, C$_{7-30}$ alkarylene or aralkylene, where Q optionally contains silicon, tin or ether oxygen atoms within alkylene segments;

X and X$^1$ are, independently, H, CH$_3$ or CH$_3$CH$_2$;

Y and Y$^1$ are, independently, O, S, NH or NR;

R is a hydrocarbyl or polymeric radical which is an aliphatic, alicylcic, aromatic or mixed aliphatic-aromatic radical containing up to 20 carbon atoms, optionally containing one or more silicon, tin or ether oxygen atoms within said aliphatic radical and optionally containing one or more functional substituents that are unreactive under polymerizing conditions.

3. Process of claim 2 wherein Q contains silicon, tin or ether oxygen atoms within alkylene segments.

4. Process of claim 2 wherein X and X$^1$ are H or CH$_3$.

5. Process of claim 2 wherein Y or Y$^1$ are O.

6. Process of claim 2 wherein the difunctional monomer is selected from the group consisting of:

1,3-propanediol dimethacrylate;
1,4-butanediol dimethacrylate;
hexamethylene dimethacrylate;
hexamethylene diacrylate;
diethyleneglycol dimethacrylate;
tetraethyleneglycol dimethacrylate;
1,4-bis(3-methacryloxypropyldimethylsilyl)butane;
1,2-bis(2-methacryloxyethoxydimethylsilyl)ethane; and
(±)-2,2'-((1,1'-binaphthalene)-2,2'-diylbis(oxy))-bis(ethanol)-dimethacrylate.

7. Process of claim 2 wherein the initiator is bis[(1-methoxy-2-methylpropenyl)oxy]dimethylsilane.

8. Process of claim 1 wherein the difunctional initiator is of the formula (R$^1$)(R$^2$)M(Z$^1$)(Z$^2$) wherein R$^1$ and R$^2$, independently, are H or a hydrocarbyl radical which is an aliphatic, alicyclic, aromatic or mixed aliphatic-aromatic radical containing up to 20 carbon atoms, provided, however, that at least one of R$^1$ and R$^2$ is not H; Z$^1$ and Z$^2$, independently, are activating substituents selected from the group consisting of:

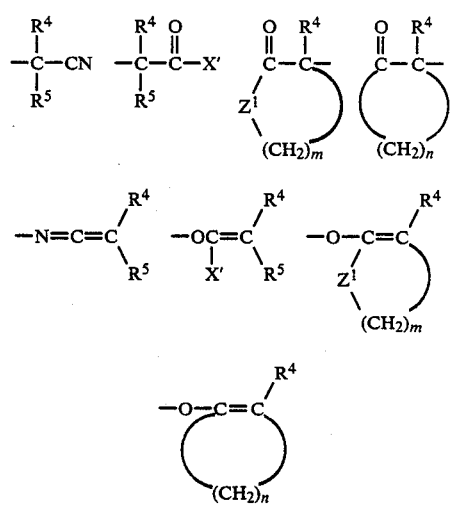

and mixtures thereof wherein X' is —OSi(R$^1$)$_3$, —R$^3$, —OR$^3$ or —NR'R"; each R' and R" is independently selected from C$_{1-4}$ alkyl, R$^3$ is a hydrocarbyl or polymeric radical which is an aliphatic, alicyclic, aromatic or mixed aliphatic-aromatic radical containing up to 20 carbon atoms, optionally containing one or more silicon, tin or ether oxygen atom(s) within aliphatic segments thereof and optionally containing one or more functional substituents that are unreactive under polymerizing conditions; each R$^4$ and R$^5$ is independently selected from H and hydrocarbyl, defined as for R$^3$ above; and either X' and R$^4$ or X' and R$^5$ taken together are

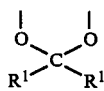

provided, however, Z$^1$ or Z$^2$ is

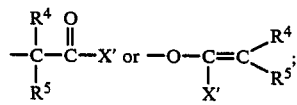

Z' is 0 or NR';

m is 2, 3 or 4;
n is 3, 4 or 5;
M is Si, Sn or Ge.

9. Process of claim 8 wherein M is Si.

10. Process of claim 8 wherein at least one of said $R^3$, $R^4$ and $R^5$ groups contains one or more silicon, tin or ether oxygen atoms within any aliphatic segment thereof.

11. Process of claim 8 wherein at least one of said $R^3$, $R^4$ and $R^5$ groups contains at least one functional substituent that is unreactive under polymerizing conditions.

12. Process of claim 8 wherein $Z^1$ and $Z^2$ are each selected from the group consisting of —C($R^4$)($R^5$)—C(O)X' and —OCX'=C($R^4$)($R^5$).

13. Process of claim 12 wherein $R^4$ and $R^5$ are $CH_3$ and X' is $OCH_3$.

14. The process of claim 6 wherein the co-catalyst is chosen from the group consisting of sources of bifluoride ions, fluoride ions, cyanide ions, azide ions, oxyanions and Lewis bases.

15. The process of claim 6 wherein the co-catalyst is tris(dimethylamino)sulfonium bifluoride.

16. The process of claim 14 wherein the co-catalyst is a source of oxyanions capable of forming a conjugate acid having pKa (DMSO) of from about 5 to 24.

17. The process of claim 16 wherein the co-catalyst is a source of oxyanions capable of forming a conjugate acid having a pKa (DMSO) of 8 to 18.

18. The process of claim 17 wherein the co-catalyst is selected from the group consisting of:
tetrabutylammonium bibenzoate;
$C_6H_5CO_2^{\ominus} {}^{\oplus}NBu_4$;
m—$ClC_6H_4CO_2^{\ominus} {}^{\oplus}NBu_4$;
$CH_3CO_2^{\ominus} {}^{\oplus}NBu_4$.

19. Process of claim 14 wherein the co-catalyst is a Lewis base of a formula selected from $(R^6)_3M'$ and

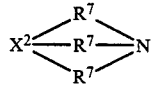

wherein:
M' is P or As;
$X^2$ is —N< or —C(H)<, provided, however, that when the difunctional monomer is a nitrile, $X^2$ is —C(H)<; and each $R^6$ is independently selected from the group consisting of
(a) a $C_{1-12}$ alkyl, $C_{4-12}$ cycloalkyl, $C_{6-12}$ aralkyl or di($C_{1-4}$ alkyl) amino group;
(b) a group of (a) wherein two or three of the alkyl, cycloalkyl and aralkyl groups are joined together by means of one or more carbon-carbon bonds;
(c) a group of (a) or (b) wherein the alkyl, cycloalkyl and/or aralkyl groups contain within aliphatic segments one or more hetero atoms selected from O, N and S; and
(d) a group of (a), (b) or (c) wherein the alkyl, cycloalkyl and/or aralkyl groups contain one or more substituents that are unreactive under polymerizing conditions; and
$R^7$ is —$CH_2CH_2$— or —$CH_2CH_2$—wherein one or more H is substituted by alkyl or other substituents that are unreactive under polymerizing conditions.

20. The process of claim 1 carried out within a temperature range of —100° C. to 150° C.

21. The process of claim 20 carried out within a temperature range of 0° C. to 50° C.

22. Process of claim 21 carried out at ambient temperature.

23. Process of claim 1 wherein the monomer is dissolved in a solvent at a concentration of about 1 wt % to 20 wt %.

24. Process of claim 1 wherein the molar ratio of initiator to co-catalyst is in the range of 0.1 to 10,000.

25. Process of claim 24 wherein the molar ratio of initiator to co-catalyst is in the range of 10 to 100.

26. Process of claim 1 wherein the concentration of initiator used in the reaction is less than 20 mM.

27. Process of claim 1 wherein the solvent is selected from the group consisting of ethyl acetate, propionitrile, toluene, xylene, bromobenzene, dimethoxyethane, diethylether, tetramethylene sulfone, N,N-dimethylformamide, N,N-dimethylacetamide, N-methylpyrrolidone, anisole, 1-butoxyethoxytrimethylsilane, cellosolve acetate, acetonitrile and tetrahydrofuran.

28. Polymer prepared by the process of claim 1.

29. "Living" polymer prepared by the process of claim 1.

30. "Living" polymer prepared by the process of claim 1 of the formula

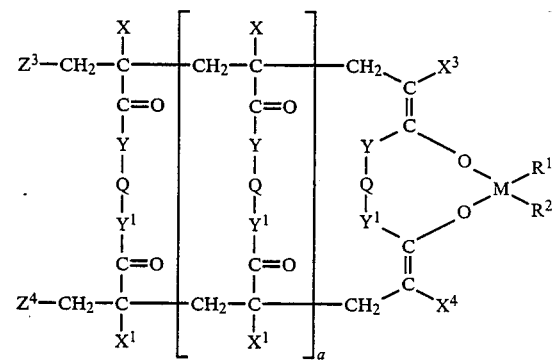

wherein
$Z^3$ and $Z^4$ are independently selected from the group consisting of —CN, OP(NR'R'')$_2$, —OP(OR$^1$)$_2$, —OP[OSi(R$^1$)$_3$]$_2$, —SR$^3$,

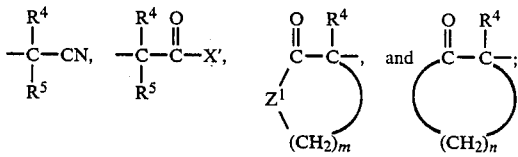

$X^3$ and $X^4$ are independently chosen from the group consisting of H, $CH_3$ and $CH_2CH_3$;
a is an integer greater or equal to 3;
and mixtures thereof with other symbols as defined in claims 3 and 9 above.

31. "Living" polymer of claim 30 wherein Q contains silicon, tin or ether oxygen atoms within alkylene segments.

32. "Living" polymer of claim 30 wherein Q is selected from the group consisting of:
—($CH_2$)$_3$—;
—($CH_2$)$_4$—;
—($CH_2$)$_6$—;
—($CH_2$)$_2$—O—($CH_2$)$_2$—;

—$(CH_2)_2$—$(O$—$CH_2CH_2$—$)_2$—;
—$(CH_2)_2$—$(O$—$CH_2CH_2$—$)_3$—;
—$(CH_2)_3Si(Me)_2$—$(CH_2)_4$—$Si(Me)_2$—$(CH_2)_3$—;
—$(CH_2)_2$—$O$—$Si(Me)_2$—$(CH_2)_2$—$Si(Me)_2$—$O$—$(CH_2)_2$—; and
($\pm$)-2,2'-((1,1'-binaphthalene)-2,2'-diylbis(oxy))-bis(ethyl).

33. "Living" polymer of claim 30 wherein X, $X^1$, $X^3$ and $X^4$ are selected from the group consisting of H and $CH_3$.

34. "Living" polymer of claim 30 wherein Y and $Y^1$ are O.

35. "Living" polymer of claim 30 wherein M is Si and $R^1$ and $R^2$ are $CH_3$.

36. "Living" polymer of claim 35 wherein $R^4$ and $R^5$ are $CH_3$ and X' is $OCH_3$.

37. "Living" polymer of claim 30 wherein $Z^3$ and $Z^4$ are —$C(R^4)(R^5)$—$C(O)$—X'.

38. Process of preparing the quenched polymer from the "living" polymer of claim 29 comprising quenching the "living" polymer with an active hydrogen source.

39. Process of claim 38 wherein the active hydrogen source is selected from the group consisting of acid, water and alcohol.

40. Process of preparing the quenched polymer from the "living" polymer of claim 29 comprising quenching the polymer with an acylating agent.

41. Process of claim 40 wherein the acylating agent is selected from the group consisting of acyl chloride, acyl fluoride, aryl ether and carboxylic anhydride.

42. A "non-living" polymer produced by the process of claim 38 in the form

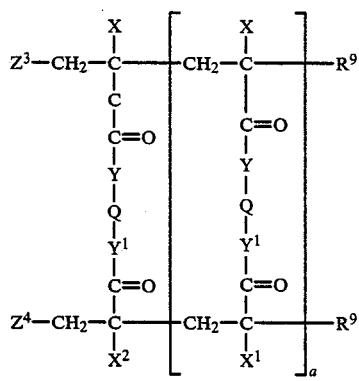

where
$R^9$ is chosen from H and $C(O)R^{10}$;
$R^{10}$ is a $C_{1-12}$ hydrocarbyl radical which is aliphatic, aromatic or mixed aliphatic-aromatic;
and with the other symbols as defined by claim 30 above.

43. The "non-living" polymer of claim 42 where X and $X^1$ are $CH_3$, Y and $Y^1$ are O and $Z^3$ and $Z^4$ are —$C(Me)_2C(O)OMe$.

44. The "non-living" polymer of claim 42 wherein Q is selected from the group consisting of
—$(CH_2)_3$—;
—$(CH_2)_4$—;
—$(CH_2)_6$—;
—$(CH_2)_2$—$O$—$(CH_2)_2$—;
—$(CH_2)_2$—$(O$—$CH_2CH_2$—$)_3$—;
—$(CH_2)_3Si(Me)_2$—$(CH_2)_4$—$Si(Me)_2$—$(CH_2)_3$—;
—$(CH_2)_2$—$(O$—$CH_2CH_2$—$)_2$—;
—$(CH_2)_2$—$O$—$Si(Me)_2$—$(CH_2)_2$—$Si(Me)_2$—$O$—$(CH_2)_2$—; and
($\pm$)-2,2'-((1,1'-binaphthalene)-2,2'-diylbis(oxy))-bis(ethyl).

45. A ladder polymer consisting essentially of repeat units of the structure

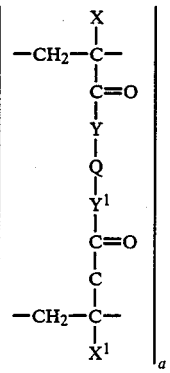

where a is greater than or equal to 3 and X, X', Y, Y' and Q are as defined in claim 3; provided that said ladder polymer is not caused to be insoluble in common organic solvents by crosslinking of said ladder polymer.

46. A block ladder polymer containing blocks consisting essentially of repeat units of the structure

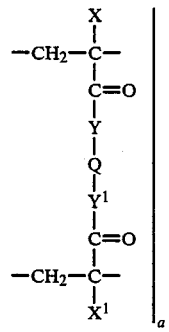

where a is greater than or equal to 3 and X, X', Y, Y' and Q are as defined in claim 3; provided that said block ladder polymer is not caused to be insoluble in common organic solvents by crosslinking of said block ladder polymer.

47. A coating composition containing the polymer described by claim 29.

48. A coating composition containing the polymer described by claim 42.

49. A coating composition containing the polymer described by claim 45.

50. A coating composition containing the polymer described by claim 46.

51. A solution or dispersion produced by dissolving or dispersing the polymer of claim 45 in an aprotic solvent.

52. A solution or dispersion produced by dissolving or dispersing the polymer of claim 46 in an aprotic solvent.

53. Film prepared from the solution of claim 51.

54. Film prepared from the solution of claim 52.

55. A liquid membrane containing the polymer of claim 45 dissolved in a suitable solvent.

56. A liquid membrane containing the polymer of claim 46 dissolved in a suitable solvent.

57. The polymer of claim 45 comprising a ladder homopolymer derived from a single difunctional monomer species.

58. The polymer of claim 45 comprising a ladder copolymer derived from more than one difunctional monomer species.

59. The polymer of claim 46 comprising a block copolymer composed of homopolymeric or copolymeric ladder sections and homopolymeric or copolymeric non-ladder sections.

60. The polymer of claim 59 wherein the ladder sections are derived from hexamethylene dimethacrylate and the non-ladder sections are derived from 1,4-butanediol methacrylate or lauryl methacrylate.

61. The polymer of claim 60 wherein the copolymer is a hexamethylene dimethacrylate/1,4-butanediol dimethacrylate/hexamethylene dimethacrylate block copolymer.

62. The polymer of claim 60 wherein the copolymer is a hexamethylene dimethacrylate/lauryl methacrylate/hexamethylene dimethacrylate block copolymer.

63. The "living" polymer of claim 59 wherein the ladder sections are derived from diethylene glycol dimethacrylate and the non-ladder sections are derived from 2-ethylhexyl methacrylate.

64. The liquid membrane of claim 55 or claim 56 wherein Q in the polymer of claim 29 is $-CH_2CH_2OCH_2CH_2-$.

65. A Group Transfer Polymerization process resulting in the formation of ladder polymers comprising contacting, under polymerizing conditions in the presence of a solvent, at high dilution, one or more difunctional monomers or mixtures of difunctional monomers with a difunctional Ti—, Zr—or Hi-containing initiator, and wherein the monomers are added to the initiator at a rate that is slow enough so that the said ladder polymers are not caused to be insoluble in common organic solvents by crosslinking of said ladder polymer.

66. The solution of claim 51 used as a coating on a substrate.

67. The solution of claim 52 used as a coating on a substrate.

* * * * *

UNITED STATES PATENT AND TRADEMARK OFFICE
CERTIFICATE OF CORRECTION

PATENT NO. : 4,906,713
DATED : March 6, 1990
INVENTOR(S) : Dotsevi Yao Sogah

It is certified that error appears in the above-identified patent and that said Letters Patent is hereby corrected as shown below:

Cover page, at [22], "Jan. 31, 1969" should read --Jan. 31, 1989--.

Column 23, lines 33, 34 and 35, " $C_6H_5CO_2^{\ominus\oplus}NBu_4$; $m-ClC_6H_4CO_2^{\ominus\oplus}NBu_4$; $CH_3CO_2^{\ominus\oplus}NBu_4$. "

should read -- $C_6H_5CO_2^{\ominus\oplus}NBu_4$; $m-ClC_6H_4CO_2^{\ominus\oplus}NBu_4$; $CH_3CO_2^{\ominus\oplus}NBu_4$. --.

Signed and Sealed this

Second Day of April, 1991

*Attest:*

HARRY F. MANBECK, JR.

*Attesting Officer*     *Commissioner of Patents and Trademarks*